INVENTOR
ROBERT M. ARTHUR

United States Patent Office 3,740,320
Patented June 19, 1973

3,740,320
APPARATUS AND METHOD FOR MEASURING THE AMOUNT OF GAS ABSORBED OR RELEASED BY A SUBSTANCE
Robert M. Arthur, 344 Potomac Ave., Terre Haute, Ind. 47803
Filed Jan. 25, 1971, Ser. No. 109,256
Int. Cl. C12k 1/00
U.S. Cl. 195—103.5 R             10 Claims

ABSTRACT OF THE DISCLOSURE

This invention relates to an apparatus and method for measuring the amount of gas absorbed or released by a substance and in particular for measuring the biological activity of bacterial cultures. The apparatus and method are useful, for instance, in water pollution control in studies to determine the strength of waste water.

Biological activity of bacterial cultures has always been associated with gas production or gas utilization. Cellular metabolism, i.e., biological activity, in aerobic cultures is related to the utilization of oxygen and in anaerobic cultures to the production of methane. In water pollution, the food for the culture of organisms is waste and the oxygen utilized or methane produced indicates the amount of waste, i.e., the degree of pollution. The amount of biological activity is reflected in the rate of oxygen consumption or methane production. These rates are particularly useful to control waste treatment operations.

For stream monitoring, the most common method of measuring biological activity is the 5-day B.O.D. (Biochemical Oxygen Demand). The 5-day B.O.D. is useful in describing the past demand on the stream but useless for pollution control because of the five-day delay.

In waste treatment plants, the activated sludge process utilizes the concentration and settling characteristics of suspended solids in the mixed liquor to measure the biological activity of the process. This is known as the sludge volume index (S.V.I.). It is usually taken only once or twice a day and therefore has limited application in control.

Another measurement which is used to indicate biological activity is volatile solids which is related to the amount of oxidizable material. It does not indicate the rate of oxygen demand.

Additional methods of measuring biological activity include chemical oxygen demand (C.O.D.), total organic carbon (T.O.C.) and other rapid combustion techniques. The results generally have little relationship to biological oxygen demand which is a relatively slow oxidation process and takes place under much different environmental conditions.

The actual biological activity of waste water, i.e., oxygen demand, is difficult to measure. Ideally, the rate should be measured without removing the sample from its environment. In the standard 5-day B.O.D. test, samples are incubated at average stream temperature (68 degrees F.), seeded and buffered in an effort to simulate stream conditions.

In an attempt to produce a better indication of biological activity, especially in activated sludge waste treatment plants, dissolved oxygen probes have been placed in aeration tanks to give an indication of the stage of oxidation. At best, dissolved oxygen is a static measure of the concentration of oxygen at time $t$, but does not indicate the rate of oxygen demand. If the values of D.O. (Dissolved Oxygen) are plotted against time, the resulting graph indicates the rate of change of D.O., not oxygen demand. In effect, the graph is a measurement of the difference between the rate of demand and supply. If the rates are equal, the D.O. is constant, but the oxygen demand could be high. Oxygen demand rates can be used to predict changes in D.O. levels and are therefore particularly useful in control.

The apparatus and method of the instant invention can be used wherever it is necessary to monitor waste water for information or control purposes. The rates of demand or production can be fed directly into recorders, data processors or controllers. Applications include:

Monitoring

Rivers, streams and lakes to determine the strength of pollution; industrial flows into sewer systems as a basis for sewer service fee; waste treatment plant effluents to report to regulatory agencies; determine plant efficiency by measuring oxygen demand of influent and effluent.

Process control

Measure biological activity of activated sludge to control flow, aeration time or quantity of air; determine oxygen demand of effluents to control plant operation; measure oxygen demand of return sludge to control amount of return; measure rate of methane production in anaerobic digestors to control feeding and withdrawal cycles.

Respirometric methods of measuring biological activity date back to the early days of this century. Without this technique much of the present knowledge of cellular metabolism would be unknown.

Respirometry measures biological activity by relating changes in pressure in a closed system to oxygen demand. The pressure change is due to the volume decrease of gaseous oxygen during respiration, assuming any carbon dioxide produced is absorbed, as in hydroxide solution. The term respirometery can also be applied to measuring the change of concentration of oxygen during respiration.

This invention is particularly concerned with an automatic recording apparatus and method for measuring the accumulated amount of oxygen absorbed by a liquid culture, e.g. of a bacteria microorganism suspension, which apparatus and method, of course, can be adapted to other situations, for instance, to situations involving a liquid or solid substance which either absorbs or releases a gas, when it is desired to determine the amount or rate of such gas absorption or expiration by the substance. The apparatus can be used for batch or continuous flow methods. In biological applications, however, the batch method can be advantageously employed to provide a continuous graphical record of oxygen utilization by a culture.

The apparatus is sensitive, simple to use, inexpensive to construct and highly accurate in measuring the gas absorption and expiration characteristics of a substance and in this connection has been found particularly useful in measuring oxygen utilization by bacteria cultures. Although the measurement is automatic, this invention affords a number of advantages other than its automatic recording features, for instance, the apparatus can be provided with an aeration chamber large enough to contain a large amount of culture. This is often necessary so that a truly representative sample of large volumes of waste is tested. The large sample volume also provides for better accuracy of a low oxygen demand.

Another advantage of the apparatus of the present invention resides in the provision of rapid agitation and fine bubble aeration to maximize the rate of gas transfer. Other more specific advantages will be set forth infra in connection with the description of the apparatus.

When utilized in connection with biological applications involving aerobically respiring cultures in aqueous suspensions, the apparatus of the present invention automatically records the rate of oxygen utilized, e.g. consumed by (i.e. the oxygen demand of) the respiring culture in respiration and can be characterized as a "recording respirometer." Since the measurements may be affected by rate of solution as well as biological oxygen demand, the invention provides for oxygen availability faster than the rate of oxygen demand.

In the invention of this application, the change in gas concentration is measured. Normally, an oxygen analyzer, e.g., a paramagnetic oxygen analyzer or oxygen probe, or a methane analyzer, e.g. a chromatographic methane analyzer, is used. Preferably, the analyzer is connected to a recording device. The components of the apparatus normally include a gas circulation system which comprises a closed aeration chamber containing the culture or other substance to be tested, a line for collecting gas from above the culture and discharging the gas, preferably through a diffuser, at the bottom of the aeration chamber; a substance circulation system comprising a line for collecting the liquid culture or other substance below the liquid level and discharging the liquid, preferably through a spray-type manifold, above the top of the liquid level in the aeration chamber; a measuring and recording system comprising a gas concentration analyzer, preferably an oxygen analyzer, such as a paramagnetic oxygen analyzer or oxygen probe, or a methane analyzer, such as chromatographic methane analyzer, in the gas line for measuring the concentration of a particular gas, such as oxygen or methane, in the gas and a continuous recorder to provide a graph of gas utilization versus time. In a closed system, as bacteria utilize oxygen and create carbon dioxide there is no effective change in pressure. However, it can be necessary to remove the carbon dioxide from the circulated air in the system, for example, because of interference with the oxygen sensor or for biological reasons. When used to measure oxygen consumption by a biological culture, a NaOH bubbler can be included in the gas circulation line to absorb carbon dioxide. The pressure in the system will be reduced because of the volume change due to the carbon dioxide removal. This change in pressure can adversely affect some microorganisms as well as some types of equipment, in which case it will be desirable to maintain a constant pressure in the system, for example, a pressure close to atmospheric. This is done by adding a chamber filled with inert gas, such as nitrogen, in the gas circulation line so that the inert gas can be introduced, preferably automatically, into the system, making up for loss of oxygen volume.

The description of the apparatus and operation of the method of this invention will be more clearly understood by reference to the following figures which illustrate the invention but are not to be considered limiting.

Figure 1:
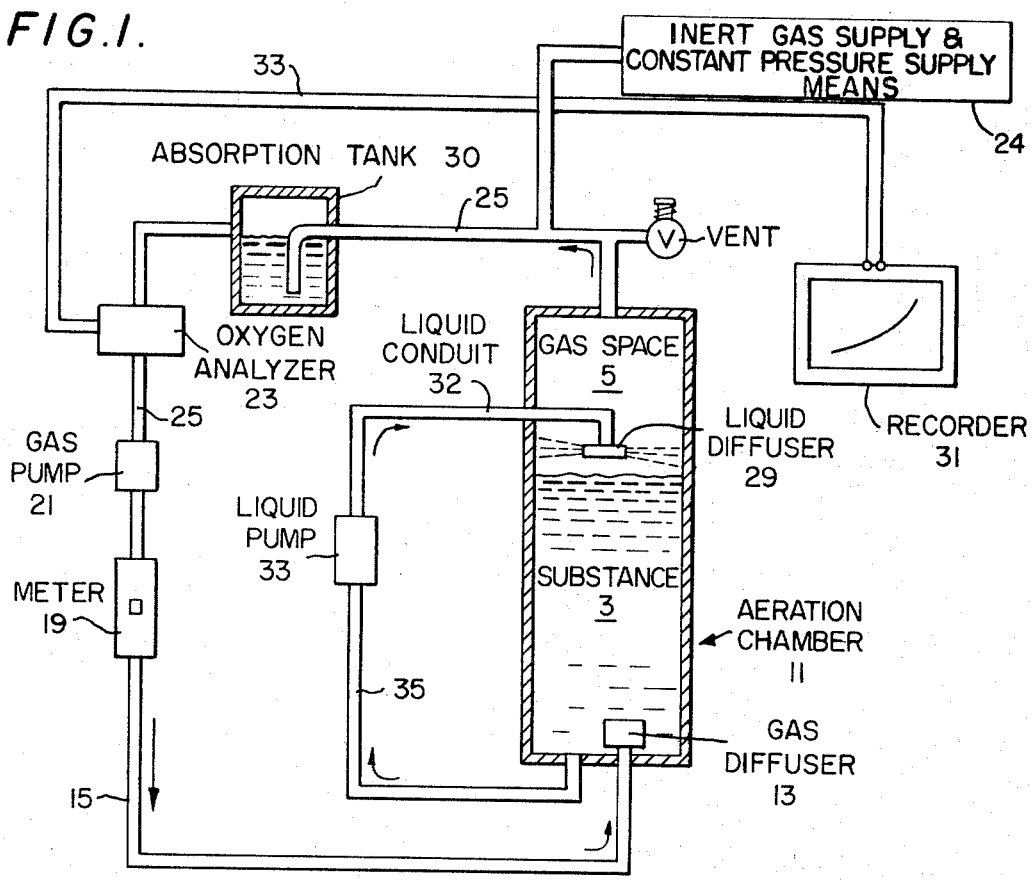
FIG. 1 illustrates the apparatus of the present invention.

There is shown in FIG. 1 a substance 3, e.g. bacteria culture, in fluid-tight aeration chamber 11. As the culture in the aeration chamber absorbs oxygen, the partial pressure of the oxygen in the gas space 5 decreases. The gas space 5 is in gas-tight correspondence with the liquid culture 3 in the aeration chamber 11 through lines 27, 25, oxygen analyzer 23, gas pump 21, meter 19 and line 15. The gas from gas space 5 is circulated through this system and the concentration of oxygen is measured in the oxygen analyzer 23. The oxygen analyzer is calibrated to reflect the concentration of oxygen. This oxygen concentration information is fed to the recorder 31. The result is a record of oxygen partial pressure with time, i.e., an oxygen consumption curve.

The following description will provide a more specific embodiment of the present invention. In the drawing, aeration chamber 11, suitable for holding bacterial culture 3 or some other oxygen absorbing substance in liquid suspension, is provided with a closed, air-tight gas circulation means comprising a gas diffuser 13, in a gas circulation relationship with gas space 5 of chamber 11, and a closed, air-tight liquid circulation system including a liquid diffuser 29 in a liquid circulation relationship with the liquid culture 3 of chamber 11.

The apparatus employed as an aeration chamber can be a glass column, 60 cm. in height, 5.0 cm. in diameter and having a working volume of 1.0 liter. Any size aeration chamber, however, can be used thus advantageously providing for the use of varied amounts and kinds of substances which can be tested for their gas absorption and expiration characteristics. The diffuser at the bottom may be stone for fine bubble aeration or other material to provide large bubble aeration. Diffuser 13 is attached to the exit end of a gas conduit 15 which in turn is connected to air-tight pump 21 by way of gas conduit 15 and meter 19. Between the pump 21, which must be leak-proof (fluid-tight) and may be a piston, diaphragm or perastaltic pump, and diffuser 13, may be installed a meter 19, preferably a rotameter.

The pump can be a perastaltic pump built by Sigmamotor, Model No. T6, Tygon tubing can be used to prevent absorption of oxygen. The method of operation of this pump assures contamination-free gas recycling. The air flow rate, generally ranging from about 5 cc./min. to 1000 cc./min., can be conveniently changed by changing the motor speed or the size of the tubing. The rate of gas flow can be advantageously maintained at a high rate to insure an ample supply of gas for adsorption by substance 3.

The inlet end of the pump 21 is connected to gas space 5 of aeration chamber 11, preferably at its top, by lines 25 and 27 through oxygen analyzer 23.

Line 25 may also include absorption tank 30 which may be provided with a contaminant absorbing substance, such as NaOH for removal of carbon dioxide from the gas, e.g. air or oxygen-enriched air, being recycled from space 5 to the bottom of aeration chamber 11, and up and through culture 3. This particular solution tank contains 100 ml. of 10% NaOH solution. Line 25 also includes an inert gas reservoir 24 and a metering means to maintain a constant pressure in the system.

Liquid diffuser 29 may be a conical spray nozzle similar to a shower head which directs the liquid in a cone-shaped spray to the liquid surface at the wall. Diffuser 29 is attached to the exit end of a liquid conduit 32 which in turn is connected to air-tight pump 33. The pump can be a finger pump, such as described above for gas pump 21. The liquid pump 33 provides for continuous recycle of the liquid culture to assist aeration, to prevent sedimentation or stratification, and to assist in foam control at the liquid surface. The inlet end of the pump 33 is connected to the liquid culture 3 in aeration chamber 11, preferably at the bottom of the chamber, by line 35.

The oxygen analyzer 23 measures the amount of oxygen in the gas phase of a gas-tight system in which the gas is constantly recycled. The oxygen analyzer is thus continuously measuring the amount of oxygen present. The oxygen analyzer 23 can be any suitable oxygen analyzer such as an oxygen probe (commercially available from Beckman Instruments or Yellow Spring Instruments) or paramagnetic oxygen analyzer (commerccially available from Servomex Chemical Instruments) or the like, capable of direct oxygen concentration measurement in a closed system. The oxygen analyzer is suitably connected by wires 33 to recorder 31 which converts the oxygen concentration to a written record. The recorder can be any of the known recording devices capable of producing a written record from the output of the oxygen analyzer. The recorder 31 is preferably arranged to print the record of oxygen consumption, e.g., as the decrease in oxygen concentration in the gas phase per unit time as the oxygen is absorbed by the liquid culture.

In an advantageous method, utilizing the invention of this application, a sample of bacteria culture, i.e. sewage, is introduced manually into the chamber. The air and liquid recycling pumps are started. The system is closed to the atmosphere and the air from the top of the chamber is circulated through the oxygen analyzer to beneath the level of the water solution of bacteria culture in the chamber. The solution is also circulated from below the solution level to a level above the solution level. As the oxygen is circulated in the system from the top of the chamber to beneath the level of the water solution, it passes through the oxygen analyzer and is continuously analyzed for oxygen concentration.

When used with anaerobic cultures, the system is first flushed with nitrogen to remove oxygen. Adsorption of other gases such as hydrogen sulfide may be necessary. The gas recirculation is fed through a methane gas analyzer which could be a chromatographic gas analyzer.

Figure 2:
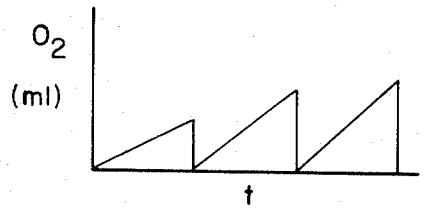
FIG. 2 illustrates a representative graph resulting from one embodiment of the instant invention.

In another advantageous method, the apparatus is used for on-line continuous measurement of oxygen utilization. A sampling tank, separate from the chamber, is continuously fed bacteria culture. Periodically an aliquot of the sample is automatically introduced into the chamber, the system is closed and the oxygen utilization is measured during a period of time $t$ (15 min. to one hour). At the end of the period the system is automatically opened, the sample is drained out and a new sample is introduced to repeat the procedure. The graph of oxygen demand is shown in FIG. 2. The oxygen demand is directly related to the ml. of oxygen at the end of each period.

Figure 3:
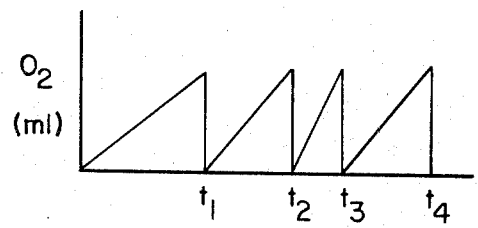
FIG. 3 illustrates a representative graph resulting from another embodiment of the instant invention.

In another advantageous method, the system incorporates an upper limit switch on the recorder in addition to the components included above. The upper limit switch is used to control the automatic operation of the device. In this method the oxygen demand must reach the upper limit on the recorder to start another sampling sequence. The graph of oxygen demand is shown in FIG. 3. The oxygen demand is inversely related to the length of the sampling period. Either method can be advantageously used to automatically control a process involving as a factor the gas absorption or gas expiration characteristics of a substance.

It is claimed:

1. Apparatus for measurement of the absorption and expiration of a particular gas by a substance comprising a fluid-tight chamber having a lower space for holding the substance and an upper gas space for holding a mixture of gases in contact with the substance; a first gas line having an inlet in gas communication with the upper gas space and having an outlet; gas analyzing means connected to the first gas line outlet for measuring the concentration of the particular gas in the gas mixture passing therefrom; a second gas line having an inlet connected to the gas analyzing means for receipt of the gas mixture therefrom and having an outlet in the lower space for passage of the gas mixture thereto; pump means coupled in one of the first and second gas lines for pumping the gas mixture from the upper gas space, through the first gas line, the gas analyzing means, and the second gas line, to the lower space whereby the particular gas is absorbed or expired by the substance; and inert gas supply means connected to one of the first and second gas lines for supplying inert gas to maintain the pressure in the upper gas chamber constant; the measurement of the concentration of the particular gas indicating the absorption and expiration of the particular gas by the substance.

2. The apparatus of claim 1 further comprising a substance circulation system for circulating the substance through the lower space.

3. The apparatus of claim 2 wherein the substance circulation system includes a substance line interconnecting the lower space and the upper gas space and conducting means for conducting the substance through such line from the lower space into the upper gas space.

4. The apparatus of claim 1 wherein the measuring means interposed in the gas circulation system converts the concentration of the gas to electrical signals, and includes a recording means to record the electrical signals and thereby provide a measurement of the gas absorption and gas expiration of the substance.

5. The apparatus of claim 1 wherein the apparatus measures gas absorption and the inert gas supply means includes a reservoir of inert gas interconnected into the gas circulation system and means for introducing the inert gas into the gas circulation system to maintain the pressure in such system constant.

6. The apparatus of claim 5 wherein the analysis means is an oxygen analyzer measuring the oxygen concentration of the gas.

7. The apparatus of claim 5 wherein a sodium hydroxide absorber is included in the gas circulation system to absorb carbon dioxide.

8. The apparatus of claim 1 wherein the analysis means is a methane analyzer measuring the methane concentration of the gas.

9. A method of measuring the oxygen absorption of an aqueous culture of an aerobically respiring bacteria which comprises introducing an aqueous culture of an aerobically respiring bacteria into the chamber of a circulation system including a fluid-tight chamber and circulation means connecting the upper portion of the chamber and the lower portion of the chamber; closing the system to the atmosphere; circulating oxygen-containing gas from the upper portion of the chamber, through the circulation means, to the lower portion of the chamber beneath the level of the aqueous culture; absorbing carbon dioxide from the oxygen containing gas as the oxygen containing gas circulates through the circulation means; supplying inert gas to maintain the gas pressure in the circulation system constant during circulation of the oxygen containing gas; continuously measuring the decrease in oxygen concentration of the oxygen containing gas during circulation thereof; and determining the oxygen absorption of the aqueous culture from the decrease in oxygen concentration.

10. The method of claim 9 further including circulating the aqueous culture of aerobically respiring bacteria through the chamber.

References Cited

UNITED STATES PATENTS

| 3,586,605 | 6/1971 | Hosler | 195—28 R |
| 3,057,785 | 10/1962 | Olsen | 195—142 X |
| 3,476,366 | 11/1969 | Brooks et al. | 195—142 X |
| 3,282,803 | 11/1966 | Poepel et al. | 23—230 R X |
| 3,547,811 | 12/1970 | McWhirter | 210—15 X |
| 3,547,813 | 12/1970 | Robinson et al. | 210—15 X |
| 3,348,409 | 10/1967 | Arthur | 73—19 |

ALVIN E. TANENHOLTZ, Primary Examiner

M. D. HENSLEY, Assistant Examiner

U.S. Cl. X.R.

195—109, 142, 143, 144; 73—19, 23—230 R, 253 R